(12) United States Patent
Takman et al.

(10) Patent No.: US 11,579,318 B2
(45) Date of Patent: Feb. 14, 2023

(54) CHARACTERIZATION OF AN ELECTRON BEAM

(71) Applicant: Excillum AB, Kista (SE)

(72) Inventors: Per Takman, Kista (SE); Tomi Tuohimaa, Kista (SE); Ulf Lundström, Kista (SE)

(73) Assignee: EXCILLUM AB, Kista (SE)

( * ) Notice: Subject to any disclaimer, the term of this patent is extended or adjusted under 35 U.S.C. 154(b) by 0 days.

(21) Appl. No.: 17/777,747

(22) PCT Filed: Nov. 12, 2020

(86) PCT No.: PCT/EP2020/081854
§ 371 (c)(1),
(2) Date: May 18, 2022

(87) PCT Pub. No.: WO2021/099202
PCT Pub. Date: May 27, 2021

(65) Prior Publication Data
US 2022/0404514 A1 Dec. 22, 2022

(30) Foreign Application Priority Data
Nov. 19, 2019 (EP) .................................... 19209895

(51) Int. Cl.
*G01T 1/34* (2006.01)
(52) U.S. Cl.
CPC ...................... *G01T 1/34* (2013.01)
(58) Field of Classification Search
CPC ........................................................ G01T 1/34
See application file for complete search history.

(56) References Cited

FOREIGN PATENT DOCUMENTS

| | | |
|---|---|---|
| EP | 2741309 A2 | 6/2014 |
| WO | 2012087238 A1 | 6/2012 |

OTHER PUBLICATIONS

International Preliminary Report on Patentability (Form PCT/IB/373) and the Written Opinion of the International Searching Authority (Form PCT/ISA/237) dated May 17, 2022, by the International Bureau of WIPO, in corresponding International Application No. PCT/EP2020/081854. (7 pages).

Hemberg et al., "Liquid-metal-jet anode x-ray tube", Optical Engineering, Jul. 1, 2004, pp. 1682-1688.

International Search Report (PCT/ISA/210) and Written Opinion (PCT/ISA/237) dated Feb. 4, 2021, by the European Patent Office as the International Searching Authority for International Application No. PCT/EP2020/081854.

(Continued)

*Primary Examiner* — Mark R Gaworecki
(74) *Attorney, Agent, or Firm* — Buchanan Ingersoll & Rooney P.C.

(57) ABSTRACT

A method for characterizing an electron beam in a liquid metal jet X-ray source. The method includes providing the electron beam and directing the electron beam to an interaction region; providing an electron beam dump connected to ground potential for receiving the electron beam after it has traversed the interaction region; scanning the electron beam over at least part of the interaction region; measuring X-ray radiation generated by interaction between the electron beam and the electron beam dump during the scanning to obtain an X-ray profile; and calculating an electron beam characteristic based on the X-ray profile. Also a corresponding liquid metal jet X-ray source.

15 Claims, 6 Drawing Sheets

(56) References Cited

OTHER PUBLICATIONS

Otendal et al., "Stability and debris in high-brightness liquid-metal-jet-anode microfocus x-ray source", Journal of Applied Physics, American Institute of Physics, vol. 101, No. 2, Jan. 17, 2007, pp. 026102-1-026102-3.

CHARACTERIZATION OF AN ELECTRON BEAM

TECHNICAL FIELD

The invention disclosed herein generally relates to characterization of an electron beam in a liquid metal jet X-ray source.

BACKGROUND

X-ray radiation may be generated by letting an electron beam impact upon a target material. The X-ray radiation may be generated as Bremsstrahlung or characteristic line emission from the target material. The performance of the X-ray source depends inter alia on the characteristics of the focal spot of the X-ray radiation generated by the interaction between the electron beam and the target. Generally, there is a strive for higher brilliance and smaller focal spots of the X-ray radiation, which requires improved control of the electron beam and its interaction with the target. In particular, several attempts have been made to more accurately determine and control the spot size and shape of the electron beam impacting the target.

WO 2012/087238 discloses a technique for determining and controlling a width of an electron beam at its interaction point with the target. This prior art technique involves the use of a sensor having a charge-sensitive area. A measurement of the width of the electron beam is carried out by deflecting the electron beam over the sensor area while an electron target is present and partially obscures the sensor area. Because the electron target obscures or partially obscures a portion of the sensor area, the recorded sensor signal will exhibit a transition between minimal attenuation (unobscured sensor area) and maximal attenuation (behind target) of the beam. The beam width may be derived from this information, in particular from the width of the transition. For measurement purposes, however, the sensor area cannot be electrically grounded. This technique therefore entails challenges such as how to avoid short-circuits and arcing at the sensor edges.

SUMMARY

The present invention provides an improvement to electron beam impact liquid metal jet X-ray sources and is based on the idea of characterizing the electron beam by measuring X-ray radiation generated by the electron beam. More specifically, the generated X-ray radiation may be measured while the electron beam is scanned so that an X-ray profile is obtained. One or more characteristics of the electron beam can then be calculated based on the obtained X-ray profile.

Hence, in embodiments of the present invention, characteristics of the electron beam are determined through detection of X-ray radiation generated from the electron beam during scanning thereof. Since no measurement of electrical current through the portion ("the electron dump") of the X-ray source where the electron beam impacts after having traversed an interaction region is needed, this portion can be connected to ground (i.e. be electrically grounded). By relying on X-ray measurements instead of measurements of electrical current, the electron beam dump does not need to be electrically isolated from its surroundings, thereby eliminating the risk of short-circuits due to, for example, deposition of droplets of material from the liquid jet at an edge of the electron dump. Furthermore, image distortions due to deposition of droplets on the electron dump surface may be considerably reduced since such deposited material will typically either be transparent to X-rays or act as another X-ray source, depending on configuration.

One characteristic of the electron beam that is of interest is the cross-sectional extension (the width) thereof. The width, or cross-sectional extension, of the electron beam can suitably be defined as the full width at half maximum (FWHM). This is sometimes referred to as the "spot size" of the beam. The width of the electron beam in the interaction region, where it impinges on the liquid metal jet target, is an important factor affecting the X-ray generation process. Embodiments of the present invention can be used for determining the width of the electron beam in the interaction region either by using the liquid metal jet as an obscuring object over which the electron beam is scanned, or by scanning the electron beam over the interaction region and letting the electron beam pass an aperture before being detected. In the latter case, the width of the electron beam is determined at the aperture and then the width in the interaction region is determined mathematically through a straight-forward geometrical transformation. Other characteristics of the electron beam may, for example, include intensity profile and alignment.

In some embodiments of the present invention, the liquid metal jet is used as an object obscuring the electron beam from the electron beam dump. The electron beam is scanned between a first position in which the electron beam impinges on the electron beam dump unobscured by the liquid metal jet, and a second position in which the liquid metal jet obscures the electron beam dump maximally, and a suitable set of intermediate positions. The X-ray radiation generated by interaction between the electron beam and the electron beam dump is measured during scanning to obtain an X-ray profile that maps scanning positions to generated X-ray radiation, i.e. the X-ray profile can be regarded as a function of deflection settings during scanning. A transition between unobscured and obscured positions may thus be identified, and the width of such transition corresponds to the width of the electron beam measured at the liquid metal jet. As will be appreciated, a width determined in terms of scanning positions can readily be converted into units of length if the displacement of the electron beam at the liquid metal jet is known for each scanning position.

In embodiments where the electron beam is scanned over the liquid metal jet, the distance required to move the beam from one side of the jet to the other may be regarded as a measure of the width of the liquid metal jet itself. Furthermore, a location of the liquid metal jet may be obtained from the positions where the electron beam is obscured by the liquid metal jet. Variation in liquid metal jet width and/or location may be considered as indicators for the stability of the process of generating the liquid metal jet.

In some embodiments, the scanning may be performed between a first position in which at least half of the electron beam passes on a first side of the liquid metal jet before impinging on the electron beam dump, and a second position in which at least half of the electron beam passes on a second side of the liquid metal jet before impinging on the electron beam dump. A width of the electron beam may then be extracted from the change in generated X-ray radiation as the electron beam is scanned from the first side to the other. In this way, electron beam widths that exceed the liquid metal jet width can be measured.

In some embodiments, an obscuring object other than the liquid metal jet is used. Various obscuring objects could be used provided that they absorb and/or reflect electrons such that the electrons do not reach the electron beam dump.

In other embodiments, the X-ray profile is determined not only from X-ray radiation generated by interaction between the electron beam and the electron beam dump, but also by interaction between the electron beam and the liquid metal jet itself. In such embodiments, the electron beam dump functions primarily as a feature for disposal of charge. The X-ray radiation generated by interaction between the electron beam and the liquid metal jet during scanning of the electron beam is measured using an X-ray detector. As can be understood, the X-ray detector will be able to detect X-ray radiation when the electron beam impacts the liquid metal jet but will not detect any X-ray radiation when the electron beam does not impact the liquid metal jet. At some scanning position for the electron beam, the generation of X-ray radiation will be maximum, and similar to what has been described above the width of the electron beam can be determined from the relationship between scanning position and detected X-ray radiation, i.e. from the X-ray profile.

In some embodiments, the generated X-ray radiation is passed through a pin hole before being detected by the X-ray detector. Such use of a pin hole provides imaging capabilities that can be used for determining characteristics such as cross-sectional extension of the electron beam.

Accordingly, methods and devices as set forth in the independent claims are provided. The dependent claims define advantageous embodiments of the invention.

BRIEF DESCRIPTION OF THE DRAWINGS

Embodiments of the disclosed invention will be described in the detailed description below, where reference is made to the accompanying drawings, on which.

In the drawings, corresponding features are designated by the same reference numerals throughout.

DETAILED DESCRIPTION

Figure 1:
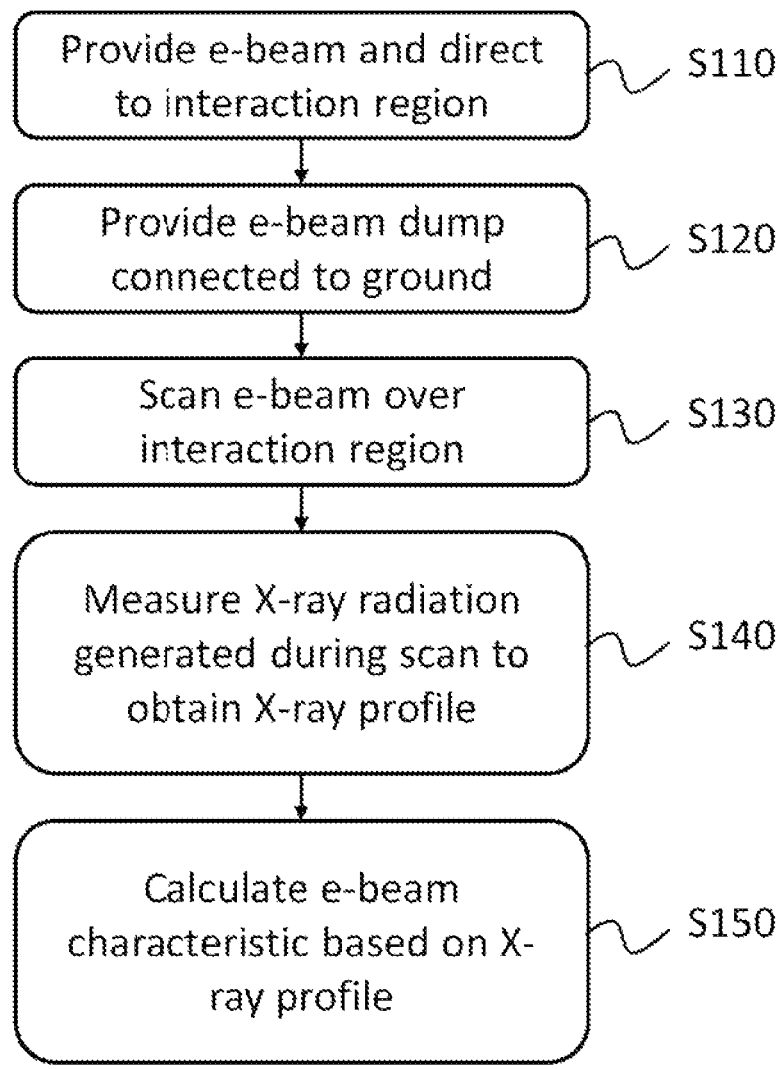
FIG. 1 is a flow chart illustrating a method according to the present invention.

Embodiments of the present invention provide characterization of an electron beam that is used for generation of X-ray radiation in a liquid metal jet X-ray source. In order to characterize the electron beam, the electron beam is scanned over an obscuring object and X-ray radiation generated during such scanning is detected. The obscuring object may be an aperture, the liquid metal jet, or some reference object.

From a general perspective, it may be preferred to make measurements at the focal plane of the electron beam, since the focal plane is typically where the electron beam will interact with the liquid metal jet target to generate X-rays during operation. However, it is also conceivable to make measurements at some other plane along the electron beam and then mathematically transform the results such that they reflect the conditions at the focal plane. In some embodiments, such transformation can conceivably be established as a part of a factory calibration procedure.

In preferred embodiments of the present invention, characterization of an electron beam is made using an obscuring object along the path of the electron beam. When the electron beam is scanned over at least part of the interaction region, the path of the electron beam will be at least partly intersected by the obscuring object for some scanning directions while the electron beam is unobscured for other scanning directions. Characteristics of the electron beam, such that the cross-sectional size or shape thereof, can thus be obtained based on how much the electron beam is obstructed for different scanning directions, which in turn is deduced by measuring X-ray radiation generated during the scanning of the electron beam.

The obscuring object may be located at various positions. For example, an aperture may be provided in front of the electron beam dump such that only electrons that pass the aperture are detected at said beam dump. This approach is useful in embodiments where the measured X-ray radiation is generated by interaction between the electron beam and the electron beam dump. Alternatively, or in addition, an obscuring object may be placed in the interaction region such that it intersects the electron beam at or near the location where it will interact with the liquid metal jet during operation of the X-ray source.

In some preferred embodiments, the liquid metal jet itself is used as the obscuring object, i.e. the edge, over which the electron beam is scanned, and the measured X-ray radiation may then be the radiation generated by interaction between the electron beam and the liquid metal jet.

In other embodiments, a reference object is inserted into the beam path of the electron beam when the measurements are made, and then removed prior to regular operation of the X-ray source. Such reference object may provide edges in more than one direction, thus facilitating measurement of, for example, electron beam astigmatism. Measurements performed using a reference object will typically be part of factory calibration or maintenance procedures.

Similar measurements can also be made "in the field" for diagnostic purposes. Some quantity may then be determined and compared to pre-set limit values without calculating actual characteristics of the electron beam. If the diagnostic measurement indicates that the electron beam is out of specification, the system may adjust settings of the electron optical system until the measured quantity is within limits, or alternatively alert the operator that maintenance is required to achieve system specifications.

Figure 2:
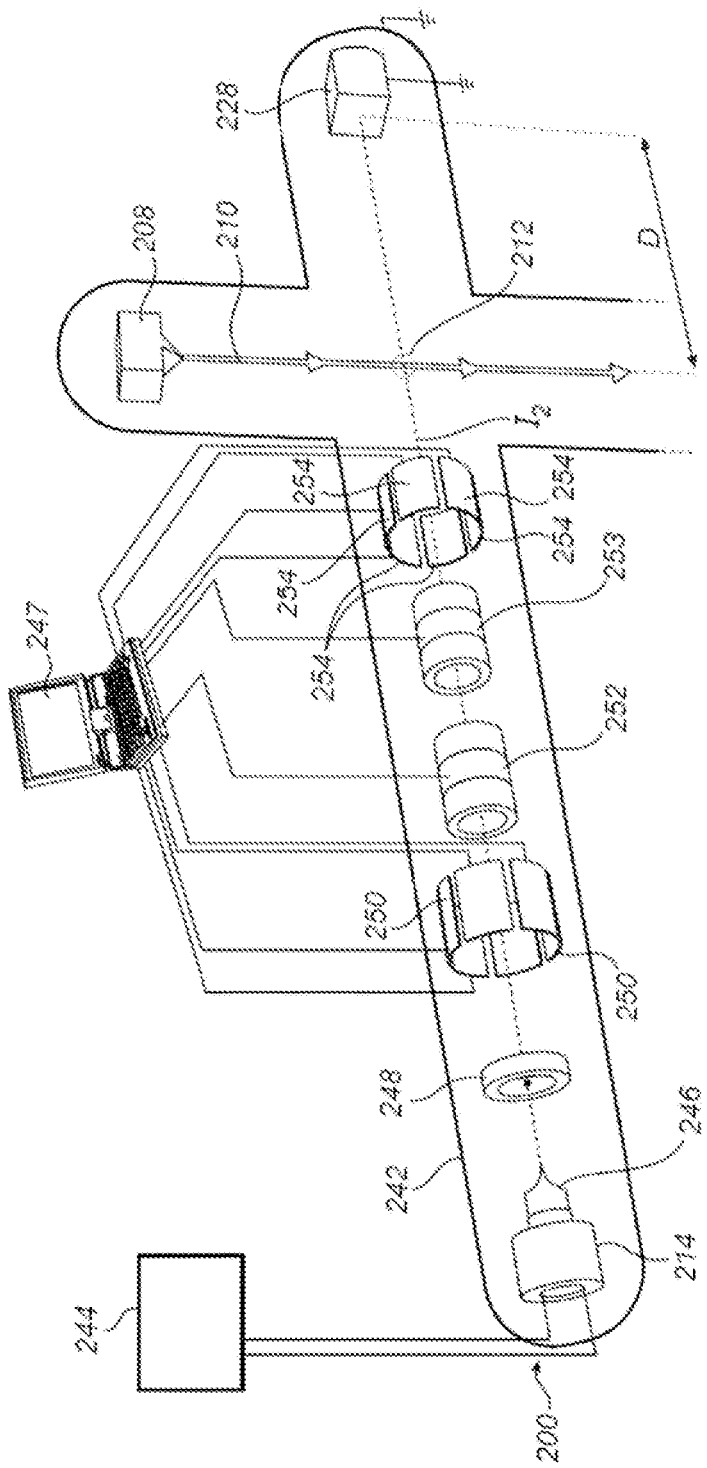
FIG. 2 is a schematic perspective view of a liquid metal jet X-ray source according to some embodiments of the invention.

A general introduction will first be given with reference to FIG. 2, which is a schematic perspective view of a liquid metal jet X-ray source 200 according to some embodiments of the present invention. The illustrated X-ray source 200 utilizes a liquid metal jet 210 as a target for the electron beam. It should be noted that some of the illustrated features of the X-ray source 200 are merely included as possible examples and may not necessarily be present in or required for the operation of all embodiments.

The X-ray source 200 comprises an electron source 214, 246, and a liquid jet generator 208 configured to form the liquid jet 210 that functions as an electron target. The components of the X-ray source 200 are located in a gas-tight housing 242. Some components, however, such as a power supply 244 and a controller 247, can be located outside of the gas-tight housing 242. It is also conceivable that various electron-optical components that operate by electromagnetic interaction may be located outside the housing 242 if the housing does not screen off electromagnetic fields to any significant extent (e.g. austenitic stainless steel).

The electron source generally comprises a cathode 214 which is powered by the power supply 244 and includes an electron emitter 246, e.g. a thermionic, thermal-field or cold-field charged-particle source. Typically, the electron energy may range from about 5 keV to about 500 keV. An electron beam from the electron source is accelerated towards an accelerating aperture 248, at which point the electron beam enters an electron-optical system that comprises an arrangement of aligning plates 250, lenses 252 and an arrangement of deflection plates 254. Variable properties of the aligning plates 250, lenses 252, and deflection plates 254 can be controlled by signals provided by the controller 247. In the illustrated example, the deflection and alignment plates 250, 254 are operable to accelerate the electron beam in at least two transversal directions. After an initial calibration, the aligning plates 250 are typically maintained at a constant setting throughout a work cycle of the X-ray source 200, while the deflection plates 254 are used for dynamically scanning or adjusting an electron spot location during use of the X-ray source 200. Controllable properties of the lenses 252 include their respective focusing powers (i.e. focal lengths). Although FIG. 2 symbolically depicts the aligning, focusing and deflecting means in a way that may suggest that they are of the electrostatic type, the invention may equally well be embodied using electromagnetic equipment or a mixture of electrostatic and electromagnetic electron-optical components. The X-ray source 200 may also comprise stigmator coils 253, which may provide for adjustment of the cross-sectional shape of the electron spot.

Downstream of the electron-optical system, an outgoing electron beam 12 intersects with the liquid metal jet 210 in an interaction region 212. This is where the X-ray production may take place. X-ray radiation may be led out from the housing 242 in a direction that does not coincide with the propagation direction of the electron beam. Any portion of the electron beam 12 that continues past the interaction region 212 may reach an electron beam dump 228 that is electrically connected to ground. As shown in the figure, the electron beam dump 228 may be located a distance D away from the interaction region 212 so that it does not interfere with the regular operation of the X-ray source 200. There may also be provided an aperture (not shown in FIG. 2) arranged so that electrons passing through the aperture impinge on the electron beam dump 228 while electrons not passing through the aperture do not.

FIG. 1 illustrates a method according to the present invention.

A method according to the present invention for characterizing an electron beam in a liquid metal jet X-ray source comprises the steps of providing S110 the electron beam and directing the electron beam to an interaction region; providing S120 an electron beam dump connected to ground potential for receiving the electron beam after it has traversed the interaction region; scanning S130 the electron beam over at least part of the interaction region; measuring S140 X-ray radiation generated during the scanning to obtain an X-ray profile; and calculating S150 an electron beam characteristic based on the X-ray profile.

Figure 3:
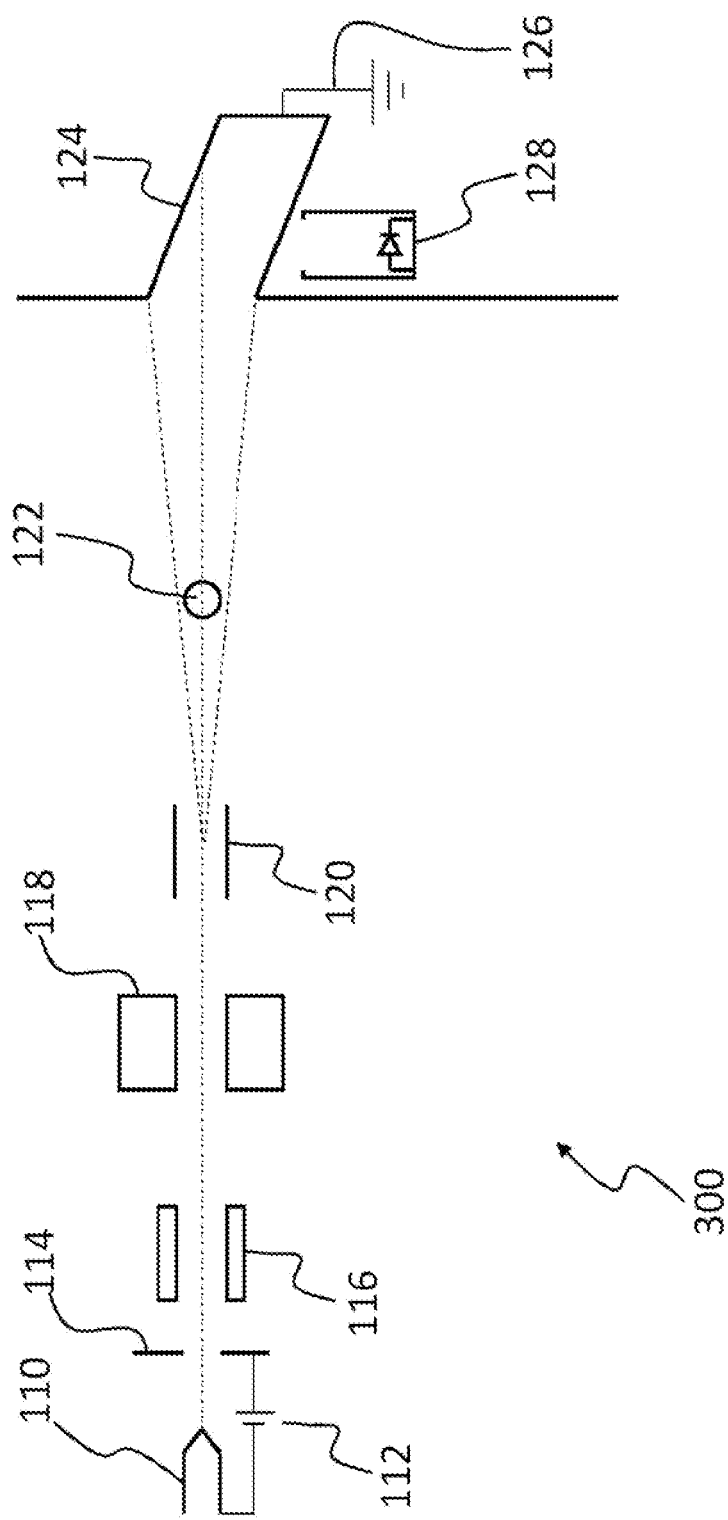
FIG. 3 schematically shows a first embodiment of a liquid metal jet X-ray source according to the invention.

In a preferred embodiment, the step S140 of measuring X-ray radiation generated during the scanning comprises measuring X-ray radiation generated by interaction between the electron beam and the electron beam dump. For example, a cross-sectional extension (width) of the electron beam may be determined by scanning the electron beam over the interaction region, and thereby over the electron beam dump, and at the same time measure the X-ray radiation generated. An aperture may be provided such that X-ray radiation is only generated at the electron beam dump by any part of the electron beam that passes through the aperture. An aperture may, for example, be provided as illustrated in FIG. 3, where only those electrons that reach the electron beam dump surface 124 contribute to the X-ray radiation detected. By correlating the direction of the electron beam (e.g. in terms of the voltage applied to corresponding deflection plates) to the detected X-ray radiation, an X-ray profile is obtained that can be used to calculate the cross-sectional extension of the electron beam in the scan direction. By scanning the electron beam in more than one direction across the aperture, the full cross-sectional extension of the electron beam can be calculated.

Alternatively, rather than relying on an aperture that limits the amount of electrons that reach the electron beam dump, an object partly intersecting the path of the electron beam can be provided. Any object that absorbs and/or reflects electrons can be used. In this context, it may be preferred to use the liquid metal jet target for this purpose. The electron beam is then scanned across the obstructing object, which functions as a kind of inverted aperture in the sense that it prevents electrons from reaching the electron beam dump. When the electron beam impinges on the electron beam dump unobscured by the object, a maximum amount of X-ray radiation will be generated. As the electron beam is scanned over the object, it will become partly obscured and the amount of generated X-ray radiation at the electron beam dump will decrease until the electron beam is maximally obscured by the object. Again, an X-ray profile is obtained that can be used to calculate the cross-sectional extension of the electron beam.

In other embodiments, the method involves measuring X-ray radiation that is generated by interaction between the electron beam and the liquid metal jet target during scanning of the electron beam.

Figure 4:
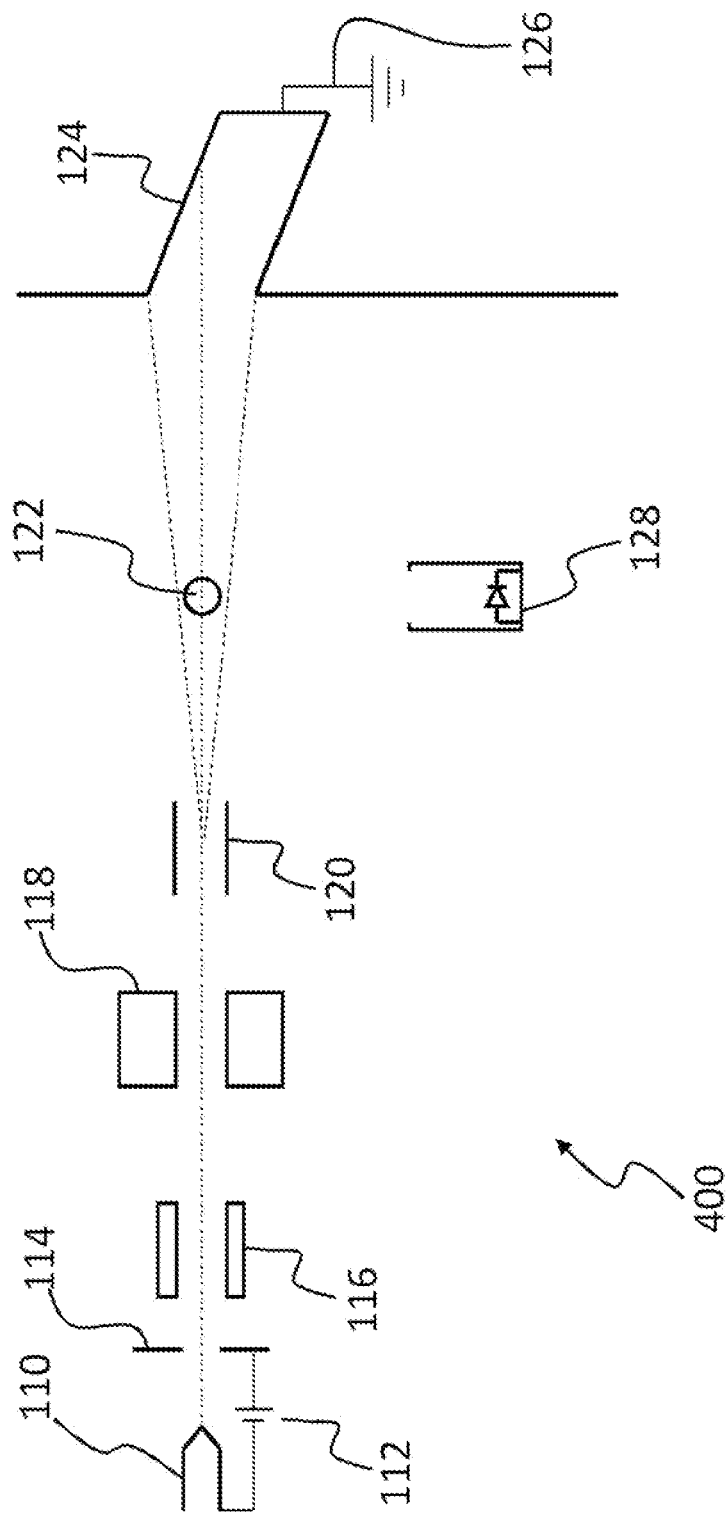
FIG. 4 schematically shows a second embodiment of a liquid metal jet X-ray source according to the invention.
Figure 5:
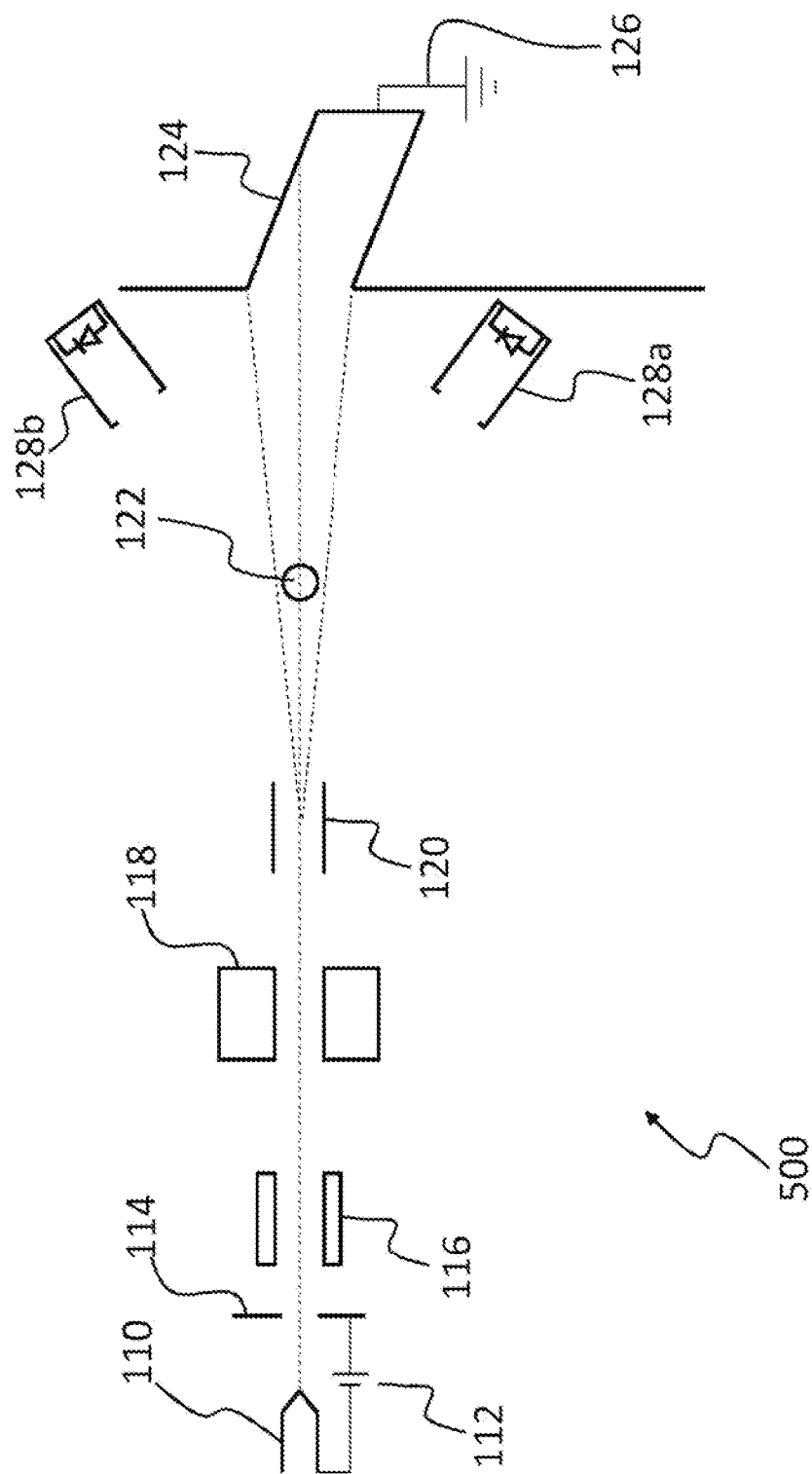
FIG. 5 schematically shows a third embodiment of a liquid metal jet X-ray source according to the invention.
Figure 6:
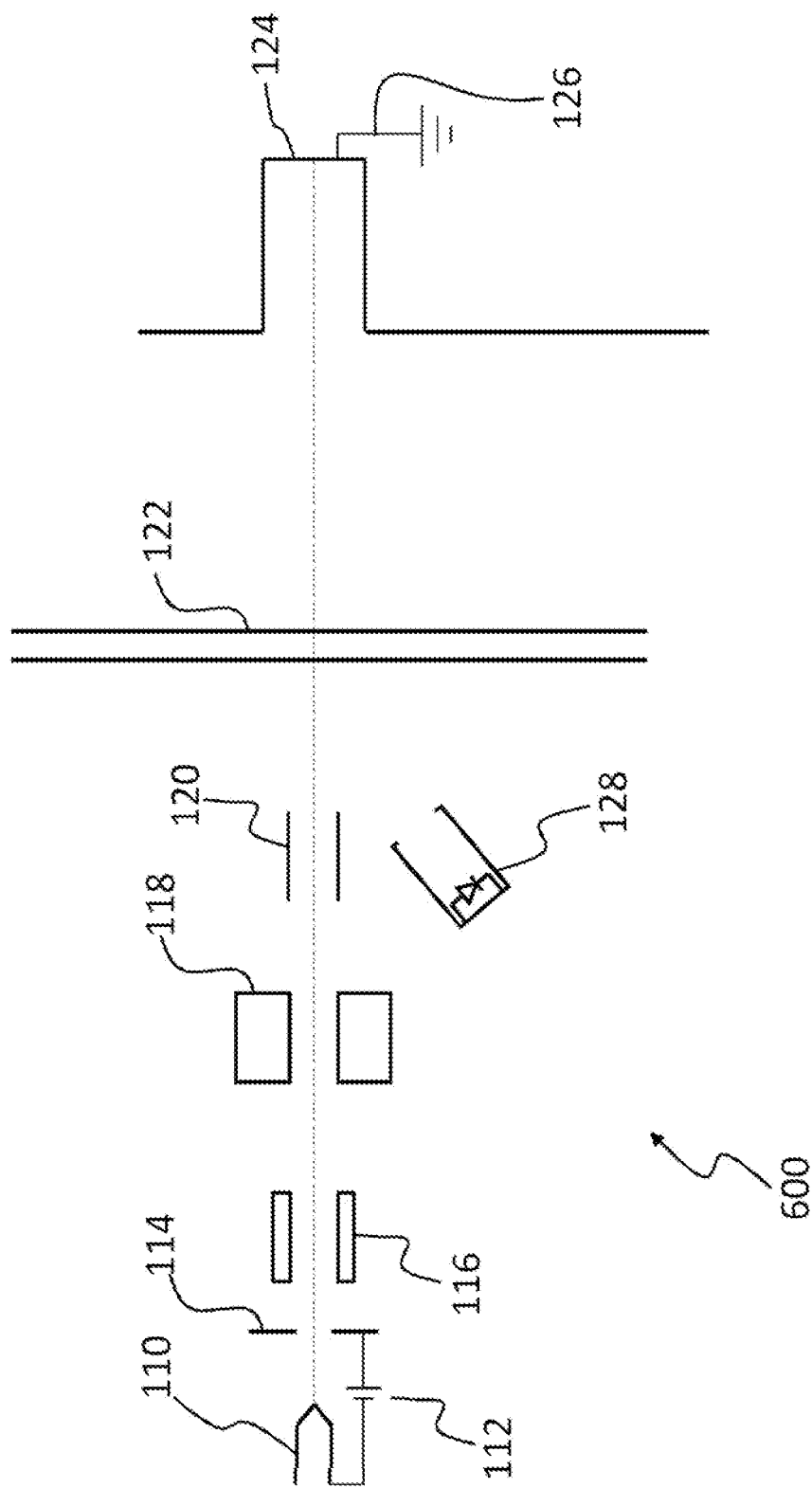
FIG. 6 schematically shows a fourth embodiment of a liquid metal jet X-ray source according to the invention.

In a liquid metal jet X-ray source as schematically shown in FIGS. 4-6, where one or more X-ray detectors are positioned for detecting X-ray radiation generated by interaction between the electron beam and the liquid metal jet, the step S140 of measuring X-ray radiation generated during the scan to obtain the X-ray profile thus comprises measuring X-ray radiation generated by interaction between the electron beam and the liquid metal jet.

The influence of self-absorption of X-ray radiation in the liquid metal jet target can be reduced by using two X-ray detectors 128a and 128b located on either side of the interaction region as schematically shown in FIG. 5. The step S140 of measuring X-ray radiation generated during the scan to obtain an X-ray profile may then include considering the total detected X-ray radiation at the two detectors, for example by summing the outputs from the two detectors. If the two detectors are positioned symmetrically on either side of the interaction region, then the sum of the outputs will compensate for any self-absorption induced asymmetry in the X-ray profile as recorded by one of the detectors because a correspondingly higher or lower level of X-ray radiation will be detected at the other detector. If the detectors are not symmetrically positioned, then suitable weights may be applied to the respective outputs before summing.

The influence of self-absorption of X-ray radiation in the liquid metal jet can be further reduced by measuring generated X-ray radiation from the same side that the electron beam impacts the liquid metal jet, as schematically shown in FIG. 6. In such set-up, there will not be any self-absorption influencing the generated X-ray radiation between the interaction region and the X-ray detector. This may be particularly useful for alignment purposes, because the detector will "see" where the electron beam impacts the liquid metal jet. The X-ray detector may be provided with imaging capabilities, for example by including a CCD array, and a pin hole may be provided between the CCD array and the interaction region where the electron beam impacts the liquid metal jet in order to enhance the imaging.

An X-ray detector including, for example, a CCD array and a pin hole similar to the above can also be useful in the set-up as shown in FIG. 4. The X-ray detector will then "see" the generated X-ray radiation.

Alternatively, some other object capable of generating X-ray radiation upon electron impact may be positioned at the interaction region during the characterization, and in such embodiments the liquid metal jet may thus be absent during the characterization.

FIG. 3 shows schematically a liquid metal jet X-ray source 300 according to a first embodiment of the present invention. The source 300 comprises an electron source/cathode 110 that emits electrons towards an anode 114. An acceleration potential 112 can be applied between the cathode 110 and the anode 114 to accelerate the emitted electrons. Downstream from the anode 114 there is arranged one or more alignment coils 116 for alignment of the electron beam. One or more focusing lenses 118 and deflection plates 120 are also arranged along the electron beam path, to focus and direct the electron beam towards an interaction region where the electron beam can interact with a liquid metal jet target 122. During normal operation, useful X-ray radiation is generated by interaction between the electron beam and the liquid metal jet 122 in the interaction region. The X-ray source 300 also comprises an electron beam dump 124 upon which electrons that have passed the interaction region impact. The electron beam dump 124 is electrically connected to ground, such that the electrons impacting thereupon are disposed, i.e. dumped.

In the embodiment of FIG. 3, the electron beam dump 124 is arranged so that X-ray radiation is generated when electrons impact thereupon. An X-ray detector 128 is provided to detect X-ray radiation generated from the electron beam dump 124. The detector 128 may be arranged such that it detects only X-ray radiation generated from the electron beam dump (and not radiation generated, for example, from interaction between the electron beam and the liquid metal jet 122). With such configurations, alignment and focusing procedures can be performed in a similar manner as for a conventional electron beam dump in which the electrical current through the beam dump is measured, for example as discussed in above-mentioned WO 2012/087238. However, since X-ray radiation generated from the beam dump 124 is used in the procedure rather than the electrical current through the beam dump, there is no need to maintain the beam dump 124 at some particular electrical potential. To the contrary, in embodiments of the present invention the electron beam dump 124 is electrically connected to ground, as shown at 126 in FIG. 3. Therefore, in case a metal droplet, for example, should attach at the edge of the beam dump 124 no detrimental short circuit occurs, and the deposited metal droplet will also generate X-rays upon electron impact, thus not disabling the functionality.

In some embodiments, the design may be optimized in the sense that the material of the electron beam dump 124 provides for similar cross section for X-ray generation for all relevant orientations of the electron beam. An embodiment may, for example, comprise a flat surface arranged at a suitable angle with respect to the impact direction of the electron beam. In other embodiments, the electron beam dump 124 may comprise a cylindrical surface where the radius of the cylinder is large compared to a distance that the electron beam moves across the surface during scanning of the electron beam across an aperture of the electron beam dump.

Preferably, the electron beam dump is provided with a suitable cooling arrangement in order to handle the thermal load associated with the impact of the electron beam.

In embodiments of the present invention, the electron beam dump 124 is electrically connected to ground. Charge build-up at the beam dump 124 is thereby effectively prevented, and prior art problems relating to short circuits between the beam dump and other parts of the arrangement are avoided. It should be noted, however, that the electron beam dump 124 may not need to be consistently connected to ground. It is conceivable that the grounding is activated intermittently, for example when a threshold potential at the beam dump has been reached, to dump the accumulated charge to ground optionally over a suitable current limiting arrangement, e.g. a resistor. The preferred embodiments, however, have the electron beam dump 124 consistently connected to electrical ground such that the electron beam dump is maintained at ground potential. It is conceivable within the scope of the invention to create a virtual ground potential for the enclosure and the electron beam dump, i.e. these components may actively be held at a certain electrical potential not necessarily equal to zero. Embodiments of this type may have design advantages in some circumstances, but the general concept of the invention is not affected.

Any suitable type of detector may be used for the X-ray detector 128, for example a cadmium telluride (CdTe) diode in a tungsten (W) housing.

In the embodiment shown in FIG. 3, the X-ray profile during scanning of the electron beam is obtained by measuring X-ray radiation generated by interaction between the electron beam and the electron beam dump 124. Optionally, an object such as the liquid metal jet target 122 can be present to partly obscure the electron beam during scanning. The X-ray detector 128 is positioned such that it only detects X-ray radiation from the electron beam dump and not any radiation generated from interaction between the electron beam and the liquid metal jet or any other part of the system, e.g. the housing or an aperture placed between the interaction region and the electron beam dump.

Other embodiments may also rely on detection of X-ray radiation generated by interaction between the electron beam and the liquid metal jet of the source 100 or between the electron beam and a reference object placed in the electron beam path. FIG. 4 schematically shows an embodiment of an X-ray source 400 in which the X-ray detector 128 is positioned to detect X-rays generated in the interaction region. The X-ray sensor for detecting X-rays generated in the interaction region is preferably a second sensor, dedicated for this purpose. The X-ray detector 128 may then conveniently be placed outside of a vacuum chamber of the X-ray source and detect X-ray radiation through an X-ray transparent window. A typical X-ray source according to the present invention may comprise one or more X-ray transparent windows, or ports, through which generated X-ray radiation is extracted. The detector 128 may conveniently be positioned at one such port. The detector 128 will thereby be able to detect X-ray radiation when the electron beam impacts on the liquid metal target (or a suitably placed reference object) but will not detect any X-ray radiation when the electron beam does not impact on the target.

Thereby, by sampling the X-ray detector 128 while the electron beam is scanned over the target, an X-ray intensity profile may be obtained that in turn can be used to deduce characteristics such as cross section dimensions of the electron beam. It is conceivable that self-absorption in the target may give rise to measurement of a somewhat skewed profile, but this may be compensated for either by subtracting a varying background or by only using X-ray radiation of such energy that self-absorption in the target is diminished, for example only detecting X-ray radiation with energies well above the X-ray absorption edges of the target material.

FIG. 5 shows schematically another embodiment of a liquid metal jet X-ray source 500 according to the present invention, in which self-absorption is compensated for by the use of two X-ray detectors 128a, 128b, each placed at a different angle with respect to the liquid metal jet 122. A compensated measurement can thus be obtained by considering the total detected X-ray radiation at the two detectors.

FIG. 6 schematically shows yet another embodiment, in which the X-ray detector 128 is positioned in line of sight from the interaction region but below (or above) the electron beam. As long as the X-ray detector has a sufficiently narrow field of view, any radiation generated from electrons that impact on the electron beam dump 124 may be prevented from being detected by the X-ray detector 128. With such positioning of the X-ray detector, artefacts caused by self-absorption in the target may be reduced.

As will be understood, the detector placements shown in FIGS. 3-6 may also be combined. For example, an X-ray source and/or a corresponding method that involves measurement of X-ray radiation generated by interaction between the electron beam and the electron beam dump, as shown in FIG. 3, may be combined (i.e. supplemented) with measurement of X-ray radiation generated by interaction between the electron beam and the liquid metal jet or another obscuring object as shown in any of FIGS. 4-6. It is also conceivable to have implementations in which the X-ray radiation generated by interaction between the electron beam and the electron beam dump is not considered when determining the X-ray profile, thus relying solely on one or more of the detection schemes described with reference to FIGS. 4-6.

In the various embodiments of the present invention, an X-ray profile is acquired by scanning the electron beam across either the liquid metal jet, a reference object, an aperture, or the like, and the thereby obtained X-ray profile may be used when calibrating or adjusting focus of the electron beam. For aligning the electron beam along the optical axis of the system, a second sensor, for example a sensor detecting backscattered electrons, may be used. The use of such backscatter sensor, however, may be of less advantage for a non-flat target since the backscatter coefficient will then vary as the electron beam is scanned across the target.

In case a metal droplet would deposit somewhere between the target and the X-ray detector, a reduction in the amount of X-ray radiation reaching the detector may occur but this would not disable the functionality; an X-ray intensity profile may still be obtained that can be used for determining electron beam width, although at a slightly reduced intensity.

In case an X-ray detector is used that has sufficient imaging capability, for example by being provided with a pin hole and/or including a CCD array, the extension of the focal spot in a direction substantially parallel to the liquid metal jet may be obtained by scanning the electron beam along that direction while detecting the amount of radiation that reaches the detector. The distance that the electron beam spot has to be moved for the X-ray signal to go from full signal to zero, or some other suitably defined limits, would then correspond to the beam spot size.

In the embodiments described above, detection of the X-ray radiation is direct (e.g. by using a diode-based detector). However, detection of the X-ray radiation can also be indirect by first converting the X-ray radiation to radiation having a lower frequency and then detecting the lower-frequency radiation (e.g. using a scintillator and a detector for visible light). In all embodiments, it is preferred to shield or place the X-ray detector such that only radiation from the intended source is detected. As described above, such shielding can be implemented by a CdTe diode placed inside a W casing. In preferred embodiments, the X-ray detector has a CdTe diode placed suitably deep inside a W cylinder to shield from undesired X-ray radiation. Other types of collimators for limiting the field of view of the X-ray detector are conceivable within the scope of the invention.

To summarize, embodiments of the present invention provide a method of determining a characteristic such as cross-sectional extension of the electron beam. The electron beam is directed to an interaction region. After having passed the interaction region, the electron beam impinges on the electron beam dump and the charge is disposed to electrical ground. The electron beam is scanned over at least part of the interaction region, and X-ray radiation generated during the scanning is measured in order to obtain an X-ray profile that associates measured X-ray radiation with electron beam direction. An electron beam characteristic such as the cross-sectional extension thereof is then calculated based on the generated X-ray profile.

In some embodiments, the X-ray radiation is generated by interaction between the electron beam and the beam dump, and the electron beam is passed through an aperture before reaching the electron beam dump. Only those parts of the electron beam that pass through the aperture can reach the electron beam dump and thus contribute to the generation of X-ray radiation. The X-ray profile can therefore be used to calculate a cross-sectional extension of the electron beam. It is even conceivable that the aperture is embodied as the extension of the electron beam dump itself. In other embodiments, the aperture is embodied as an opening in a wall of the liquid metal jet X-ray source, as schematically shown in the accompanying drawings. As will be appreciated, in embodiments that make use of such aperture, the electron beam needs to be scanned over sufficiently large angles so that the edges of the aperture are reached.

In other embodiments, an object that partly intersects the path of the electron beam during scanning is provided. Such object can take many different forms as long as it has the property of absorbing and/or reflecting electrons such that fewer electrons reach the electron beam dump when the object partly intersects the path of the electron beam. The object intersecting the path may be the liquid metal jet present in the interaction region.

While some example embodiments have been described herein, the skilled person will not be limited to these examples when practicing embodiments of the invention. On the contrary, many modifications and variations are possible within the scope of the appended claims. In particular, X-ray sources comprising more than one target or more than one electron beam are conceivable within the scope of the present inventive concept. Furthermore, X-ray sources of the type described herein may advantageously be combined with X-ray optics and/or detectors tailored to specific applications exemplified by, but not limited to, medical diagnosis, non-destructive testing, lithography, crystal analysis, microscopy, material science, surface physics, protein structure determination by X-ray diffraction, X-ray photo spectroscopy (XPS), critical dimension small angle X-ray scattering (CD-SAXS), and X-ray fluorescence. After having read and understood this disclosure in connection with the accompanying drawings, the skilled person will be able to implement various embodiments.

The invention claimed is:

1. A method for characterizing an electron beam in a liquid metal jet X-ray source, comprising
    providing said electron beam and directing said electron beam to an interaction region;
    providing an electron beam dump connected to ground potential for receiving said electron beam after it has traversed said interaction region;
    scanning said electron beam over at least part of said interaction region;
    measuring X-ray radiation generated by interaction between said electron beam and said electron beam dump during said scanning to obtain an X-ray profile; and
    calculating an electron beam characteristic based on said X-ray profile.

2. The method of claim 1, further comprising
    providing an object partly intersecting a path of the electron beam during said scanning, wherein said object absorbs and/or reflects electrons.

3. The method of claim 2, wherein said object is a liquid metal jet present in said interaction region.

4. The method of claim 3, further comprising calculating a characteristic of said liquid metal jet based on said X-ray profile.

5. The method of claim 2, wherein the step of measuring X-ray radiation to obtain an X-ray profile further comprises measuring X-ray radiation generated by interaction between said electron beam and said object.

6. The method of claim 5, further comprising providing a pin hole and wherein measuring a profile of X-ray radiation generated during said scanning comprises detecting X-ray radiation that has passed through said pin hole.

7. The method of claim 1, further comprising
    providing an aperture between said interaction region and said electron beam dump, said aperture being arranged so that only electrons passing said aperture contribute to the X-ray radiation measured during said scanning.

8. The method of claim 7, wherein scanning said electron beam over said interaction region comprises scanning said electron beam over said aperture.

9. A liquid metal jet X-ray source, comprising:
    an electron source arranged for providing an electron beam and directing said electron beam to an interaction region;
    an electron beam dump connected to ground potential, said electron beam dump being arranged for receiving the electron beam after it has traversed said interaction region;
    a scanning arrangement capable of scanning said electron beam over at least part of said interaction region;
    an X-ray sensor positioned and arranged to detect X-ray radiation generated by interaction between said electron beam and said electron beam dump; and
    circuitry operatively connected to said scanning arrangement and to said X-ray sensor, said circuitry being configured to determine an X-ray profile during scanning of said electron beam.

10. The liquid metal jet X-ray source of claim 9, wherein said circuitry is further configured to calculate a characteristic of said electron beam based on said X-ray profile.

11. The liquid metal jet X-ray source of claim 9, further comprising a reference object removably provided to partly intersect a path of the electron beam during said scanning, wherein said object absorbs and/or reflects electrons.

12. The liquid metal jet X-ray source of claim 9, further comprising a collimator for limiting a field of view of said X-ray sensor.

13. The liquid metal jet X-ray source of claim 9, further comprising an aperture between said interaction region and said electron beam dump, said aperture being arranged so that only electrons passing said aperture contribute to the X-ray radiation measured during said scanning.

14. The liquid metal jet X-ray source of claim 9, further comprising a second X-ray sensor positioned and arranged to detect X-ray radiation generated in the interaction region.

15. The liquid metal jet X-ray source of claim 14 further comprising a pin hole positioned and arranged so that X-ray radiation detected by said second X-ray sensor pass through said pin hole.

* * * * *